United States Patent
Keller et al.

(10) Patent No.: US 10,363,696 B2
(45) Date of Patent: Jul. 30, 2019

(54) PROCESS FOR PRODUCTION OF EMBOSSED FILMS BASED ON PLASTICIZED POLYVINYL ACETAL

(71) Applicant: KURARAY EUROPE GMBH, Hattersheim (DE)

(72) Inventors: Uwe Keller, Bonn (DE); Shinichi Muguruma, Troisdorf (DE); Detlef Hanning, Troisdorf (DE); Jan Denis Rogall, Troisdorf (DE); Keisuke Kishimoto, Troisdorf (DE)

(73) Assignee: Kuraray Europe GmbH, Hattersheim (DE)

( * ) Notice: Subject to any disclaimer, the term of this patent is extended or adjusted under 35 U.S.C. 154(b) by 248 days.

(21) Appl. No.: 15/505,416

(22) PCT Filed: Aug. 21, 2015

(86) PCT No.: PCT/EP2015/069210
§ 371 (c)(1),
(2) Date: Feb. 21, 2017

(87) PCT Pub. No.: WO2016/030284
PCT Pub. Date: Mar. 3, 2016

(65) Prior Publication Data
US 2017/0266861 A1 Sep. 21, 2017

(30) Foreign Application Priority Data
Aug. 25, 2014 (DE) .................. 10 2014 216 880

(51) Int. Cl.
*B29C 59/00* (2006.01)
*B29C 48/00* (2019.01)
(Continued)

(52) U.S. Cl.
CPC .......... *B29C 48/002* (2019.02); *B29C 43/222* (2013.01); *B29C 48/022* (2019.02);
(Continued)

(58) Field of Classification Search
CPC ............ B29C 47/0061; B29C 47/0004; B29C 47/0021; B29C 47/92; B29C 59/022;
(Continued)

(56) References Cited

U.S. PATENT DOCUMENTS

| 4,671,913 A | 6/1987 | Gen et al. |
| 5,455,103 A | 10/1995 | Hoagland et al. |

(Continued)

FOREIGN PATENT DOCUMENTS

| EP | 0 185 863 B1 | 5/1989 |
| EP | 0 741 640 A1 | 11/1996 |

(Continued)

OTHER PUBLICATIONS

PCT International Search Report, dated Nov. 20, 2015, Application No. PCT/EP2015/069210, Applicant: Kuraray Europe GmbH, 6 pages.

*Primary Examiner* — Joseph S Del Sole
*Assistant Examiner* — Lawrence D. Hohenbrink, Jr.
(74) *Attorney, Agent, or Firm* — Brooks Kushman P.C.

(57) ABSTRACT

Polyvinyl acetal films with less blocking tendency and which allow for escape of gas during laminating to form laminated composites are prepared by a process for embossing a film comprising plasticized polyvinyl acetal with a roughness Rz on at least one surfaces of 20 to 100 μm by the steps of
 a. extruding of plasticised polyvinyl acetal to a film with a stochastic roughness of the surfaces of Rz =1 to 70 μm, (Continued)

b. embossing at least one surface of the film obtained in step a) with channels having a depth of 5-50 μm, a width of 10-200 μm and a pitch of 50-2500 μm, wherein c. the surface roughness of the elevations between the channels is at most 20% lower as obtained in step a).

12 Claims, 1 Drawing Sheet

(51) Int. Cl.

| | |
|---|---|
| *B29C 48/08* | (2019.01) |
| *B32B 17/10* | (2006.01) |
| *B29C 43/22* | (2006.01) |
| *B29C 59/02* | (2006.01) |
| *B29C 59/04* | (2006.01) |
| *B29C 48/92* | (2019.01) |
| *B29K 29/00* | (2006.01) |
| *B29L 7/00* | (2006.01) |

(52) U.S. Cl.
CPC .............. *B29C 48/08* (2019.02); *B29C 48/92* (2019.02); *B29C 59/005* (2013.01); *B29C 59/022* (2013.01); *B29C 59/04* (2013.01); *B32B 17/10587* (2013.01); *B32B 17/10596* (2013.01); *B32B 17/10761* (2013.01); *B29C 59/043* (2013.01); *B29C 2059/023* (2013.01); *B29C 2948/9278* (2019.02); *B29C 2948/92514* (2019.02); *B29C 2948/92704* (2019.02); *B29C 2948/92904* (2019.02); *B29C 2948/92923* (2019.02); *B29C 2948/92942* (2019.02); *B29K 2029/14* (2013.01); *B29L 2007/008* (2013.01); *B32B 17/10577* (2013.01)

(58) Field of Classification Search
CPC ...... B29C 59/005; B29C 59/04; B29C 59/043; B29C 48/002; B29C 48/92; B29C 48/022; B29C 48/08; B32B 17/10577; B32B 17/10587; B32B 17/10596
USPC ..................................... 264/210.1, 284, 293
See application file for complete search history.

(56) References Cited

U.S. PATENT DOCUMENTS

| | | | |
|---|---|---|---|
| 5,972,280 A | 10/1999 | Hoagland | |
| 6,077,374 A | 6/2000 | Hopfe | |
| 6,093,474 A | 7/2000 | Sironi | |
| 7,511,096 B2 | 3/2009 | Papenfuhs et al. | |
| 2003/0022015 A1 | 1/2003 | Wong | |
| 2004/0191482 A1* | 9/2004 | Nakajima | B29C 59/022 428/156 |
| 2005/0256258 A1 | 11/2005 | Keller | |
| 2007/0231550 A1* | 10/2007 | Stenzel | B29C 59/04 428/172 |
| 2009/0117330 A1 | 5/2009 | Shiiina et al. | |
| 2015/0174862 A1 | 6/2015 | Kitano et al. | |

FOREIGN PATENT DOCUMENTS

| | | |
|---|---|---|
| EP | 1 233 007 A1 | 8/2002 |
| WO | 01/72509 A2 | 10/2001 |
| WO | 03/033583 A1 | 4/2003 |
| WO | 2004063231 A1 | 7/2004 |
| WO | 2014021459 A1 | 2/2014 |

* cited by examiner

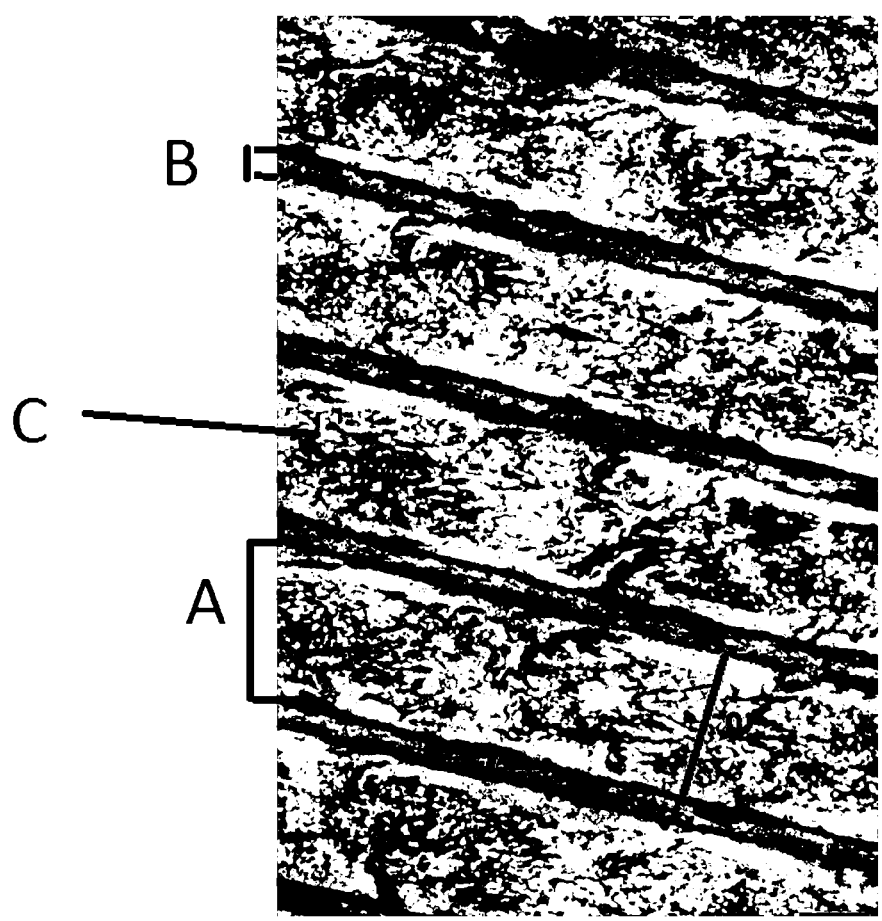

PROCESS FOR PRODUCTION OF EMBOSSED FILMS BASED ON PLASTICIZED POLYVINYL ACETAL

CROSS REFERENCE TO RELATED APPLICATIONS

This application is the U.S. National Phase of PCT Appln. No. PCT/EP2015/069210 filed Aug. 21, 2015, which claims priority to German Application No. 10 2014 216 880.5 filed Aug. 25, 2014, the disclosures of which are incorporated in their entirety by reference herein.

BACKGROUND OF THE INVENTION

1. Field of the Invention

The invention relates to a process for the production of a film based on plasticized polyvinyl acetal by embossing and to the use of the films for the production of glass laminates.

2. Description of the Related Art

Laminated safety glass consists usually of two glass panes and one adhesive film which combines the glass panes and is based on plasticized polyvinyl acetal, preferably of polyvinyl butyral (PVB). Laminated safety glass is used in particular as windscreens in motor vehicles, it being possible for a glass pane to be replaced, if necessary, by a polymer pane.

In the construction sector, too, silicate glass/silicate glass composites or silicate glass/polymer composites are used e.g. as window panes or as intermediate walls, multiple composites, i.e. composites consisting of more than two supporting layers being used, if necessary and depending on their application, e.g. as bullet-proof glass.

Plasticiser-containing films based on polyvinyl acetal, in particular on polyvinyl butyral (PVB) for the manufacture of safety composite glass are soft and tacky even at room temperature. Although the high tackiness is essential for holding the composite of glass/film/glass together in composite glass, the tackiness needs to be temporarily eliminated or, however, at least suppressed, for transportation and the process of processing them to such glass. The inherent tackiness of the films can be reduced by a certain roughness.

Moreover, it needs to be possible for the air present between the film and the glass to be removed during processing of the film to form composite safety glass. In this respect, it is generally known to provide the films on one or both sides with a roughened surface. The air enclosed during the manufacture of the glass laminate is able to escape via the roughened surface such that a bubble-free laminate is obtained.

A typical process for the manufacture of films with a roughened surface is known from EP 0 185 863 B1 as a melt fracture process. Melt fracture processes lead to irregularly (stochastically) roughened surfaces.

Embossing processes are further processes described in the state of the art for the production of a roughened surface. The common feature of all film surfaces produced by embossing processes is a regular (non-stochastic) surface structure which exhibits good ventilation behaviour, particularly in the production process for glass laminates by the vacuum bag process, and consequently permits short process times and wide processing windows.

In comparison with melt fracture processes, embossing processes have the advantage that the regular surface structure obtained allows more rapid and simpler air removal during laminate production.

EP 0 741 640 B1 describes such an embossing process for the production of a surface embossed on both sides by means of two embossing rollers by means of which the film is provided with a regular line structure of the saw tooth type. The lines embossed on each side of the film cross each other at an angle of >25° such that a so-called moiré pattern is prevented from forming in the composite glass.

EP 1 233 007 A1 discloses an embossing process for avoiding the moiré effect which process produces a regular embossing structure on each side of the film. To avoid interferences, the line structures of the two film sides have different repetition frequencies.

Another process which is described in U.S. Pat. No. 5,972,280 uses only one roller to emboss the surface structure, instead of two embossing rollers, and a structured steel band fitting snugly to the roller via rolls and compressed air, the film being guided during the embossing process through the gap between the embossing roller and the steel band.

U.S. Pat. No. 4,671,913 discloses a process for embossing PVB films, the film being embossed in a single operating process between two structured rollers. The rollers —and consequently also the embossed film—have a roughness $R_z$ of 10 to 60 µm. US 2003/0022015, WO 01/72509, U.S. Pat. No. 6,077,374 and U.S. 60/934,741 describe single stage and two-stage embossing processes for PVB films by means of embossing rollers of steel and pressing rollers with a rubber coating.

WO 2014021459 A1 discloses the manufacture of a plasticized PVB-film by embossing channels having a wide pitch of at least 750 µm.

For efficiently producing laminated glass the interlayer should have good de-airing properties and fast melt-down of the surface structure.

SUMMARY OF THE INVENTION

The present invention is directed to a process for embossing a film comprising plasticized polyvinyl acetal with a roughness Rz on at least one surfaces of 20 to 100 µm, by the process steps of a. extrusion of plasticised polyvinyl acetal to a film with a stochastic roughness of the surfaces of Rz=1 to 70 µm, b. embossing at least one surface of the film obtained in step a) with channels having a depth of 5-50 µm, a width of 10-250 µm, preferably 10-200 µm and a pitch of 50-2500 µm, wherein c. the surface roughness of the elevations between the channels is at most 20% lower as obtained in step a).

BRIEF DESCRIPTION OF THE DRAWINGS

FIG. 1 illustrates one embodiment of an embossed plasticized polyvinyl acetal film of the invention.

DETAILED DESCRIPTION OF THE PREFERRED EMBODIMENTS

The stochastic surface pattern on the elevations between the channels are created during step a) and should remain during embossing step b) essentially as obtained during step a).

Preferably, the surface roughness of the elevations between the channels obtained in step b) is at most 10%, more preferably at most 5% lower as obtained in step a. At best, the surface roughness of the elevations between the channels obtained in step a) and step b) is (remains) identical. This can be achieved by an embossing tool which has no or no full contact with the film in the areas of the elevations.

The extrusion of the melt comprising plasticised polyvinyl acetal in step a) is preferably performed under melt fracture conditions with an extrusion die having lips whose temperature can be adjusted. Such an extrusion process is known to the person skilled in the art for example from EP 0 185 863 B1.

The stochastic surface pattern on the elevations between the channels may be the same or different on the surfaces of the film. Different surface patterns or roughness levels can be produced by varying the width of the discharge gap and the temperature of the die lips directly on the die exit during melt fracture extrusion.

It is preferred to perform step a) to obtain a film with a stochastic roughness of the surfaces of Rz=10 to 70 μm and more preferably a film with a stochastic roughness of the surfaces of Rz=30 to 70 μm.

In a first variant of the invention, the extrusion is performed under melt-fracture conditions with extrusion dies having a lip temperature of 100-270° C., preferably 100-240° C.

In a second variant of the invention, the extrusion under melt-fracture conditions is performed with a melt flow rate of 500-3500 kg/h.

Subsequent to extrusion, the film is subjected to embossing in step b) on one or both sides, independently in each case, with a surface structure and a roughness depth of $R_z$=20 to 100 μm, preferably $R_z$=20 to 80 μm, in particular $R_z$=25 μm to 70 μm.

The surfaces of the film obtained in step a) can be embossed in a single step or preferably in two distinct embossing steps. In single step embossing, two embossing rolls are used, whereas in multiple step embossing, an embossing roller and a pressure roller is used. The pressing roller preferably has a surface of rubber with a Shore A hardness of 20-80.

Measuring the surface roughness of the film with the roughness value Rz is effected according to DIN EN ISO 4287 and DIN ISO 4288. The measuring devices used to measure the surface roughness must satisfy EN ISO 3274. The profile filters used must correspond to DIN EN ISO 11562.

The embossing step b) according to the invention can be carried out in such a way that the two sides of the structured film have different roughness depths $R_z$. This can be achieved e.g. by different embossing tools or temperatures of the embossing tools and/or the pressing rollers.

The channels on both surfaces of the film may share an angle of 70 to 90° or 5-45° with each other. In another aspect, the channels on at least one surface of the film have an angle of 5-45°, preferably 35-45° to the direction of extrusion.

The pitch of the channels can be the same or different on the surfaces of the film, where a deviation of 5% between the surfaces is regarded as being the same. The pitch of the channels can be 100-1500 μm, preferable 300-1000 μm.

FIG. 1 shows by way of example the surface of film produced by the method of the invention with a pitch a) of 500 μm, a channel width b) of 75 μm and a surface roughness of the elevations between the channels c) of 40 μm.

Before and/or after the embossing process, the film can be cooled to −10 to +40° C. to fix the surface structure of the film in this way. Cooling preferably takes place via correspondingly temperature-adjusted cooling rollers.

Preferably, the embossing rollers are made of metal or ceramics and possess a surface with a negative profile pattern of the structure present later on in the film surface. Higher depth of channel of embossing rollers than the intended roughness of the film is preferable to keep melt fracture surface after embossing.

The temperature of the embossing rollers is preferably 80 to 200° C., especially 80 to 170° C., more preferably 100 to 160° C., and in particular 110 to 155° C. Most preferably, the embossing rollers have a coated steel surface (e.g. coated with polymer or ceramics) in order to reduce the adhesion of the film.

In a first embodiment, the extruded film is embossed between two embossing rollers having the same or different surface embossment.

In another embodiment of the invention, the film is guided between the embossing roller and the pressing roller rotating in the opposite sense. Preferably, the film is exposed, between the embossing rollers and/or embossing and pressing rollers to a line pressure of 10 to 400 N/mm, more preferably 10 to 150 N/mm, yet more preferably 30 to 130 N/mm and in particular 40 to 110 N/mm. The line pressure can be the same or different if several process steps b) are conducted. Line pressure means the pressing force of the roller pair based on the film width.

The pressing rollers preferably have a temperature of 0 to 50° C., more preferably 5 to 30° C., i.e. they are actively cooled vis-à-vis the embossing roller. The temperature of the pressing rollers may be the same or different in process steps b).

The pressing rollers press the film into the structured surface of the embossing rollers and nestle lightly against the embossing roller. By changing the line pressure, the surface of the embossing zone and consequently the residence time of the film in the roller gap can be altered.

By selecting the process parameters of line pressure, film temperature and/or roller temperature, roller speed and enveloping angle of the film web on the rollers, the roughness depth of the film embossing can be influenced with a given roughness depth of the embossing rollers.

In this case, too, the film can be guided through the roller gap of the temperature-adjustment rollers directly, i.e. without passing around them.

It is possible to use in particular polyvinyl butyral (PVB), in the crosslinked or non-crosslinked form, as a partially acetalated polyvinyl alcohol, in admixture with at least one plasticiser, and optionally dyes, pigments, metal salts for adhesion regulation, organic additives and/or inorganic fillers.

All plasticisers known in the art for this purpose, in particular the esters of multivalent acids, polyhydric alcohols or oligoether glycols, such as e.g. adipic acid esters, sebacic acid esters or phthalic acid esters, in particular di-n-hexyl adipate, dibutyl sebacate, dioctyl phthalate, esters of diglycol, triglycol or tetraglycol with linear or branched aliphatic carboxylic acids and mixtures of these esters are suitable, on the one hand, as plasticisers for the partially acetalated polyvinyl alcohols. Esters of aliphatic diols with long chain aliphatic carboxylic acids, in particular esters of triethylene glycol with aliphatic carboxylic acids containing 6 to 10 C atoms, such as 2-ethyl butyric acid or n-heptanoic acid are preferably used as standard plasticisers for partially acetalated polyvinyl alcohols, in particular polyvinyl butyral. One or several plasticisers from the group consisting of di-n-hexyl adipate (DHA), dibutyl sebacate (DBS), dioctyl phthalate (DOP), esters of diglycol, triglycol or tetraglycol with linear or branched aliphatic carboxylic acids, in particular triethylene glycol-bis-2-ethyl butyrate (3GH), triethylene glycol-bis-n-heptanoate (3G7), triethylene glycol-bis-2-ethyl hexanoate (3G8), tetraethylene glycol-bis-n-heptanoate (4G7) are used.

In a particular embodiment of the present invention, the adhesion of the film to the embossing tools can be further reduced by adding a substance reducing adhesion to the film material.

The plasticised partially acetalated polyvinyl alcohol resin preferably contains 25 to 45 parts by weight and pyrticularly preferably 30 to 40 parts by weight of plasticiser, based on 100 parts by weight of resin.

The partially acetalated polyvinyl alcohols are produced in the known way by acetalation of hydrolysed polyvinyl esters. Formaldehyde, acetaldehyde, propionaldehyde, butyraldehyde and such like, preferably butyraldehyde, for example, are used as aldehydes.

The preferred polyvinyl butyral resin contains 10 to 25% by weight, more preferably 17 to 23% by weight and most preferably 19 to 21% by weight of vinyl alcohol radicals, and/or 0 to 20% by weight, preferably 0.5 to 2.5% by weight of acetate radicals.

In a further process variation, a PVB partially crosslinked with a polyaldehyde (in particular glutaraldehyde) and an oxocarboxylic acid (in particular glyoxylic acid) is used as polymer according to WO 2004/063231 A1. Such a partially crosslinked PVB has a viscosity which is 10 to 50% higher than that of the analogous non-crosslinked PVB.

The water content of the films is preferably adjusted to 0.15 to 0.8% by weight, in particular to 0.3 to 0.5% by weight.

The films produced according to the invention can be used in particular for the manufacture of laminates from one or several glass panes and/or one or several polymer panes and at least one structured film.

During the manufacture of these laminates, a pre-composite is first produced from the glass/polymer panes and the film by pressing, vacuum bag or vacuum ring. As a rule, pre-composite laminates are slightly turbid as a result of air inclusions. The final manufacture of the laminate takes place in the autoclave e.g. according to WO 03/033583.

0.76 mm thick PVB film containing a nominal level of 38 parts plasticizer per 100 parts PVB resin is extruded by the following conditions.

Lip temperature; 190° C.
Melt flow rate; 1000 kg/h.
Line speed; 15 m/min

This PVB film has a melt fracture surface roughness on each side characterized by value of Rz melt fracture of 40 microns.

This PVB film is embossed in a facility with the following properties. The pressing and embossing rollers of the two embossing stages had identical properties.

Facility parameters:
Hardness of the rubber roller: 70±5 Shore A
Roughness of the embossing roller: approximately 200 m
Pitch of embossing roller: approximately 500 m
Angle of the channel: 12°
Surface coating: Polymer
Temperature of rubber roller 10° C.

TABLE 1

| No. | Line pressure (N/mm) | T of embossing roller (° C.) |
|---|---|---|
| 1 | 90 | 125 |
| 2 | 130 | 125 |

TABLE 1-continued

| No. | Line pressure (N/mm) | T of embossing roller (° C.) |
|---|---|---|
| 3 | 90 | 130 |
| 4 | 110 | 130 |
| 5 | 130 | 130 |
| 6 | 90 | 135 |
| 7 | 110 | 135 |
| 8 | 110 | 200 |
| 9 | 110 | 60 |

The properties of the film are shown in the following tables, wherein "Rz final" stands for the roughness after embossing, "Rz elevation" stand for the roughness of the elevation between the channels and "Channel depth" is defined as "Rz final–Rz elevation"

TABLE 2

| | upper side (m) | | | | Lower side (m) | | | |
|---|---|---|---|---|---|---|---|---|
| No. | Channel width | Channel depth | Rz final | Rz elevation | Channel width | Channel depth | Rz final | Rz elevation |
| 1 | 75 | 6 | 46 | 40 | 75 | 6 | 45 | 39 |
| 2 | 75 | 9 | 48 | 39 | 75 | 10 | 48 | 38 |
| 3 | 75 | 13 | 51 | 38 | 75 | 12 | 50 | 38 |
| 4 | 75 | 14 | 52 | 38 | 75 | 14 | 52 | 38 |
| 5 | 75 | 16 | 54 | 38 | 75 | 16 | 54 | 38 |
| 6 | 75 | 21 | 58 | 37 | 75 | 20 | 57 | 37 |
| 7 | 75 | 22 | 59 | 37 | 75 | 22 | 59 | 37 |

During the manufacture of the composite glass, the films exhibited good air removal properties and could be processed to blister-free laminates.

COMPARATIVE EXAMPLE

TABLE 3

| | upper side (m) | | | | Lower side (m) | | | |
|---|---|---|---|---|---|---|---|---|
| No. | Channel width | Channel depth | Rz final | Rz elevation | Channel width | Channel depth | Rz final | Rz elevation |
| 8 | 75 | 6 | 133 | 7 | 75 | 133 | 140 | 7 |
| 9 | — | 0 | 40 | 40 | — | 0 | 40 | 40 |

During the manufacture of the composite glass, the films exhibited bad air removal properties and could not be processed to blister-free laminates.

Especially the sample of No. 8 showed high tackiness. It was very difficult to handle this film due to high adhesion/blocking between two layers.

With the process of the invention, plasticized polyvinyl acetal film can be produced which has a low tendency of blocking. Such film can be wound to a roll for transportation and easily unrolled for production of laminated glazing.

The invention claimed is:

1. A process for embossing a film comprising plasticized polyvinyl acetal to provide a non-stochastic roughness Rz of 20 to 100 μm on at least one surface, comprising:
   a. extruding a plasticised polyvinyl acetal to a film with a stochastic roughness of at least one surface of Rz =1 to 70 μm,
   b. embossing the at least one surface of the film obtained in step a) with channels having a depth of 5-50 μm, a width of 10-200 μm and a pitch of 50-2500 μm, having elevations between the channels, wherein the stochastic roughness of the surface of the elevations between the channels is at most 20% lower than the stochastic roughness of the film obtained in step a).

2. The process of claim 1, wherein the film is embossed with an embossing roller having a temperature of 80 to 200° C.

3. The process of claim 1, wherein the film is embossed with a line pressure of 10 to 400 N/mm.

4. The process of claim 2, wherein the film is embossed with a line pressure of 10 to 400 N/mm.

5. The process of claims 1, wherein the extrusion of the plasticized polyvinyl acetal film in step a) is performed under melt-fracture conditions.

6. The process of claim 5, wherein the extrusion under melt-fracture conditions is performed with an extrusion die having lip temperatures of 100 -270° C.

7. The process of claim 5, wherein the extrusion under melt-fracture conditions is performed with a melt flow rate of 500-3500 kg/h.

8. The process of claim 1, wherein both surfaces of the embossed film have the same pitch of channels.

9. The process of claim 1, wherein both surfaces of the embossed film have a different pitch of channels.

10. The process of claim 1, wherein the channels on both surfaces of the film have an angle of 70-90° with respect to each other.

11. The process of claim 1, wherein the channels on at least one surface of the film have an angle of 5-45° to the direction of extrusion.

12. The process of claim 1, wherein the surfaces of the film are embossed in two distinct embossing steps.

* * * * *